US009128175B2

(12) United States Patent
Matsuura et al.

(10) Patent No.: US 9,128,175 B2
(45) Date of Patent: Sep. 8, 2015

(54) OBJECT DETECTION APPARATUS

(75) Inventors: Mitsuyasu Matsuura, Chiryu (JP);
Toshihiro Hattori, Okazaki (JP)

(73) Assignees: DENSO CORPORATION, Kariya (JP);
Nippon Soken, Inc., Nishio (JP)

( * ) Notice: Subject to any disclaimer, the term of this patent is extended or adjusted under 35 U.S.C. 154(b) by 610 days.

(21) Appl. No.: 13/488,883

(22) Filed: Jun. 5, 2012

(65) Prior Publication Data

US 2012/0314541 A1    Dec. 13, 2012

(30) Foreign Application Priority Data

Jun. 7, 2011    (JP) .................. 2011-127620

(51) Int. Cl.
G01S 15/00    (2006.01)
G01S 7/527    (2006.01)
G01S 15/93    (2006.01)
G01S 15/10    (2006.01)

(52) U.S. Cl.
CPC ............... *G01S 7/527* (2013.01); *G01S 15/104* (2013.01); *G01S 15/108* (2013.01); *G01S 15/931* (2013.01); *G01S 2015/938* (2013.01)

(58) Field of Classification Search
CPC ................ G01S 15/931; G01S 15/104; G01S 2015/938; G01S 15/108; G01S 7/527
USPC .......................................................... 367/94
See application file for complete search history.

(56) References Cited

U.S. PATENT DOCUMENTS 4,661,819 A * 4/1987 Lewis ........................... 342/201
5,481,504 A * 1/1996 Rosenbach et al. ........... 367/101
5,581,232 A * 12/1996 Tanaka et al. ................. 340/435
6,232,912 B1 * 5/2001 Nagel ........................... 342/137
7,447,334 B1 * 11/2008 Jiang et al. .................... 382/103

(Continued)

FOREIGN PATENT DOCUMENTS

JP    60-90040    6/1985
JP    08-268189    10/1996

(Continued)

OTHER PUBLICATIONS

Aoyanagi et al. "Target Detection Method and Radar Device" Nov. 24, 2000; JP2000-321351A (Machine Translation).*
Office Action dated Jun. 3, 2014 in the corresponding JP application No. 2011-127620.

*Primary Examiner* — Naomi Small
(74) *Attorney, Agent, or Firm* — Harness, Dickey & Pierce, PLC

(57)    ABSTRACT

An object detection apparatus disposed in a moving body generates a transmission signal of multiple pulse sequences as a plurality of sequences of multiple pulses. A modulation signal of the transmission signal is generated by performing digital modulation on each of the multiple pulse sequences of the transmission signal according to a code sequence. A transmission wave based on the modulation signal is transmitted and a reflected wave of the transmission wave is received by the apparatus. The apparatus further detects a speed of the moving body to determine a length of the code sequence. The apparatus calculates a code correlation value between the modulation signal and a received signal, which is derived from the reflected wave, and performs pulse compression on the received signal based on the code correlation value to generate a pulse-compressed received signal. The apparatus detects an object based on the pulse-compressed received signal.

12 Claims, 7 Drawing Sheets

(56) References Cited

U.S. PATENT DOCUMENTS

| | | |
|---|---|---|
| 7,496,157 B2 | 2/2009 | Katou et al. |
| 2002/0112855 A1* | 8/2002 | Arndt et al. ............ 166/250.15 |
| 2005/0135190 A1* | 6/2005 | Katou et al. .................... 367/99 |
| 2005/0156778 A1* | 7/2005 | Yap ................................ 342/54 |
| 2007/0097785 A1* | 5/2007 | Kremer et al. ................... 367/1 |
| 2009/0046001 A1* | 2/2009 | Beilin et al. ................. 342/160 |
| 2011/0298652 A1* | 12/2011 | Yanagihara et al. .......... 342/146 |

FOREIGN PATENT DOCUMENTS

| | | | |
|---|---|---|---|
| JP | 2000-321351 | | 11/2000 |
| JP | 2000321351 A | * | 11/2000 |
| JP | 2005-083867 | | 3/2005 |
| JP | 2005083867 A | * | 3/2005 |
| JP | 2005-249770 | | 9/2005 |
| JP | 2005249770 A | * | 9/2005 |

\* cited by examiner

FIG. 6

| x | PHASE ROTATION CORRECTION COEFFICIENT OF CORRELATION FILTER 14a : K(1, X) | PHASE ROTATION CORRECTION COEFFICIENT OF CORRELATION FILTER 14b : K(2, X) |
|---|---|---|
| 1 | 1 | 1 |
| 2 | 1 | $\cos(1/6 \times \pi) + j \sin(1/6 \times \pi)$ |
| 3 | 1 | $\cos(2/6 \times \pi) + j \sin(2/6 \times \pi)$ |
| 4 | 1 | $\cos(3/6 \times \pi) + j \sin(3/6 \times \pi)$ |
| 5 | 1 | $\cos(4/6 \times \pi) + j \sin(4/6 \times \pi)$ |
| 6 | 1 | $\cos(5/6 \times \pi) + j \sin(5/6 \times \pi)$ |
| 7 | 1 | $\cos(6/6 \times \pi) + j \sin(6/6 \times \pi)$ |

OBJECT DETECTION APPARATUS

CROSS REFERENCE TO RELATED APPLICATION

The present application is based on and claims the benefit of priority of Japanese Patent Application No. 2011-127620, filed on Jun. 7, 2011, the disclosure of which is incorporated herein by reference.

TECHNICAL FIELD

The present disclosure generally relates to an object detection apparatus detecting an object.

BACKGROUND

Conventionally, an object detection apparatus for detecting an object, or existence of an object, by transmitting a pulse signal and receiving a reflected signal reflected by an object is known. In such an apparatus, for the purpose of improving an object detection distance, it is necessary to improve a signal to noise ratio (S/N ratio) of the received signal.

In view of the above, Japanese patent No. 4,283,170 (JP '170) (U.S. Pat. No. 7,496,157) discloses an apparatus which improves the S/N ratio of the received signal by using a technique of so-called "pulse compression." According to the apparatus of JP '170, a modulation signal made by a frequency modulation or a phase modulation of the pulse signal is transmitted, and, after receiving the reflected wave, the received reflected wave is orthogonally-demodulated (i.e., quadrature de-modulation) to make a received signal. Then, correlation (i.e., auto-correlation) between the received signal and the modulation signal is calculated, and such calculation result is used to compress the pulse width of the received signal, for the improvement of the S/N ratio of the received signal which is generated from the reflected wave of a standstill object.

Further, JP '170 discloses an object detection apparatus that uses a correction signal for correcting the Doppler shift of the received signal, which is received as a Doppler shifted signal from an object that moves at a constant speed (i.e., a uniform-motion object). In such an apparatus, the improvement of the S/N ratio of the received signal generated from the reflected wave of the uniform-motion object is achieved by calculating correlation between the modulation signal and the received signal after the Doppler shift correction.

Furthermore, JP '170 discloses an object detection apparatus that improves the S/N ratio of the received signal that is generated from the reflected wave of the standstill object, by (i) calculating a frequency of the Doppler shift of the received signal generated from the reflected wave of the standstill object based on the speed of the vehicle in which the object detection apparatus is installed and (ii) changing a correction signal according to the calculated frequency.

When the object detection apparatus is installed on a moving body such as a vehicle, it may be required for the apparatus to detect various objects having respectively different relative speed ranges, relative to the moving object. For example, if the moving object is a vehicle (i.e., a subject vehicle), and, if the subject vehicle is traveling on an expressway, a detection object detected by the object detection apparatus may only be other vehicles that travel side-by-side with the subject vehicle (i.e., other vehicles with relatively small speed ratio against the subject vehicle). If the subject vehicle is in a parking facility, in which the subject vehicle travels at a low speed, the relative speed of the detection object may vary in a wide range, because the detection object may be a bumping post, which is a standstill object, or may be a walker, which is a moving object. Such objects in various relative speed ranges may have to be detected at the same time.

In the technique of JP '170, the object detection on the moving body such as vehicles performs correction of the Doppler shift of the received signal, which is generated from the reflected wave of the moving object which is moving relative to the moving body, and then performs the pulse compression, for the purpose of improving the S/N ratio of the received signal. However, it is not mentioned in JP '170 that the range of the relative speed of the detection object is changed according to the speed of the moving body which is equipped with the object detection apparatus. Therefore, as for the object detection apparatus disclosed in JP '170, it is a problem that the range of the relative speed of the detection object cannot be changed according to the speed of the moving body when the object detection apparatus is installed in the moving body such as a vehicle.

SUMMARY

The present disclosure provides for an object detection apparatus used in a moving body, which is, while enabling the improvement of the S/N ratio of the received signal, capable of changing the range of the relative speed of the object detected according to the speed of the moving body.

In an aspect of the present disclosure, an object detection apparatus for use in a moving body includes a transmission signal generator, a modulation unit, a wave transmission and reception unit, a pulse compression unit, and a movement speed acquisition unit.

The transmission signal generator generates a transmission signal of multiple pulse sequences as a plurality of sequences of multiple pulses. The modulation unit generates a modulation signal of the transmission signal by performing digital modulation on each of the multiple pulse sequences of the transmission signal according to a code sequence (such as Barker code).

The wave transmission and reception unit generates and transmits a transmission wave based on the modulation signal from the modulation unit. In addition, the wave transmission and reception unit receives a reflected wave of the transmission wave.

The movement speed acquisition unit acquires a speed of the moving body. A length of the code sequence is modified according to the speed acquired by the movement speed acquisition unit.

The pulse compression unit calculates a code correlation value between the modulation signal and a received signal, and performs pulse compression on the received signal to generate a pulse-compressed received signal based on a calculation result of the code correlation value. The received signal is derived from the reflected wave received by the wave transmission and reception unit. Therefore, an object may be detected based on the pulse-compressed received signal from the pulse compression unit.

According to the above configuration, the pulse of the received signal is compressed, and the S/N ratio of the received signal is improved. As a result, such received signal has an extended object detection range.

As provided, the length of the code sequence may be changed according to the speed of the moving body. More specifically, when the speed acquired by the movement speed acquisition unit is greater than or equal to a first predetermined speed, the length of the code sequence is set to a value different from when the speed is less than or equal to a second predetermined speed, where the second predetermined seed is less than the first predetermined speed. Therefore, the length of the code sequence may be set to one of two values. In such manner, the relative speed of the detection object is set/changed to two different ranges respectively for two different situations; such as a high speed travel and a low speed travel.

In addition, when the speed acquired by the movement speed acquisition unit is greater than the first predetermined speed, the length of the code sequence is set to be longer than for when the speed is less than or equal to the second predetermined speed. In such manner, the range of the relative speed of the object detected is increased in comparison to the range for the speed of being less than or equal to the second predetermined speed. Therefore, a wide range of the relative speed is covered for detecting the object at the low speed travel time, while using a relatively narrow range of the relative speed for the detection of the object at the high speed travel time.

In addition when the moving body is stopping, the length of the code sequence is periodically switched. In such manner, the longer code sequence length is used to improve the S/N ratio of the received signal, and the shorter code sequence length is used to enable detection of a closer detection object. In other words, detection of an object closer to the moveable object is enabled and, at the same time, the S/N ratio of the received signal is improved.

BRIEF DESCRIPTION OF THE DRAWINGS

Other objects, features and advantages of the present invention will become more apparent from the following detailed description disposed with reference to the accompanying drawings, in which:

FIG. 6 is a table of phase rotation correction coefficients of each code of each of correlation filters.

DETAILED DESCRIPTION

An embodiment of the present disclosure is described with reference to the drawings.
(First Embodiment)
The first embodiment of the present disclosure is described as an object detection apparatus 100.

Figure 1:
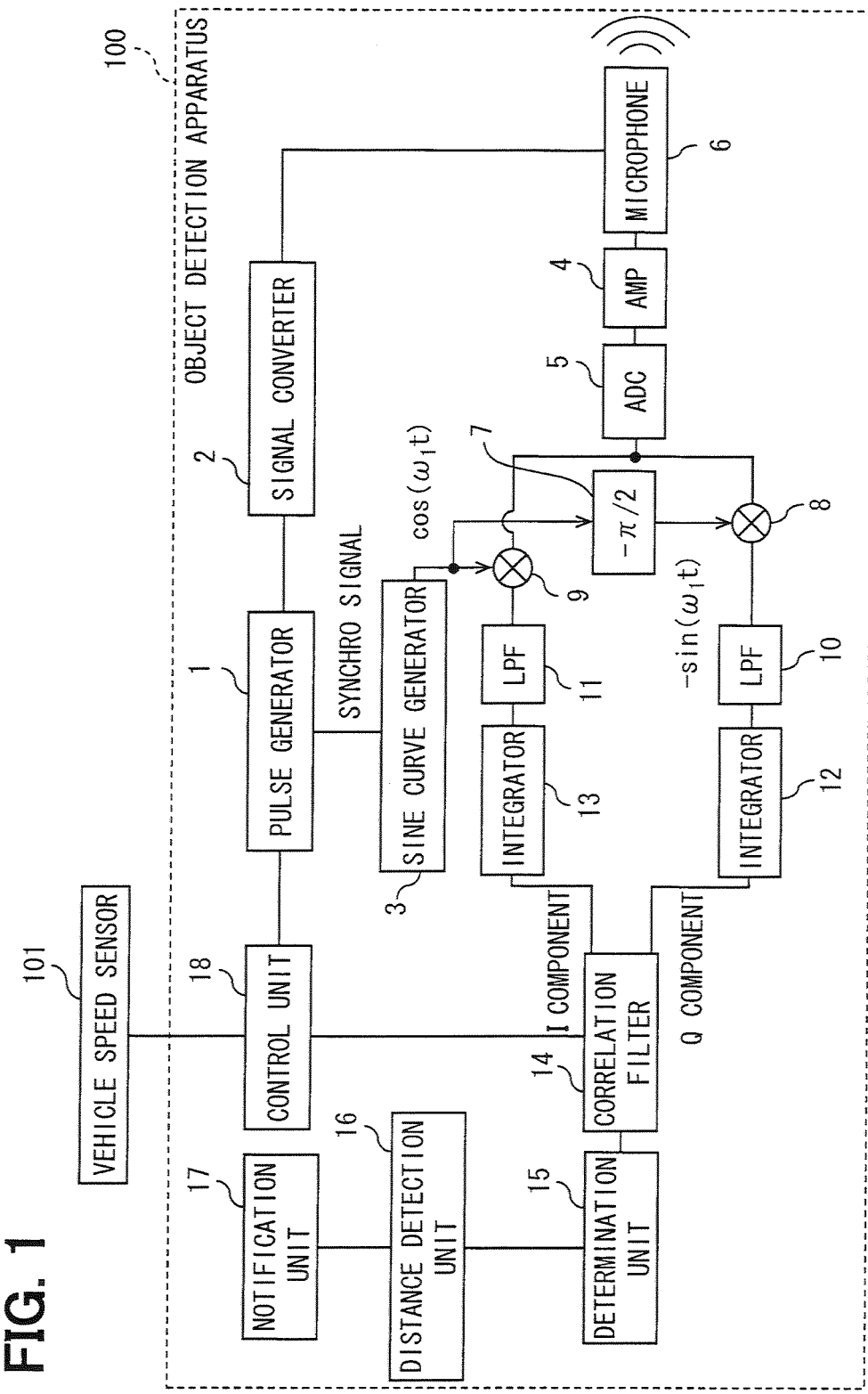
FIG. 1 is a block diagram of an object detection apparatus in a first embodiment of the present disclosure.

FIG. 1 is a block diagram of the configuration of an object detection apparatus 100. For example, the object detection apparatus 100 in FIG. 1 is disposed in a vehicle. Further, the vehicle carrying the object detection apparatus 100 is designated as a subject vehicle in the following.

The object detection apparatus 100 includes a pulse generator 1, a signal converter 2, a sine wave generator 3, an AMP (amplifier) 4, an ADC (analog/digital converter) 5, a microphone 6, a phase shifter 7, multipliers 8, 9, LPF (low pass fitters) 10, 11, and integrators 12, 13. Further, the object detection apparatus 100 includes a microcomputer, which is not illustrated, and serves as a calculator/processor of various kinds, such as a correlation filter 14, a determination unit 15, a distance detection unit 16, a notification unit 17, a control unit 18.

The pulse generator 1 generates a burst pulse signal as a sequence of pulse streams (i.e., multiple pulses) having an angular frequency $\omega$ (i.e. a pulse signal in the following), and outputs the pulse signal to the signal converter 2. Further, as for the pulse generator 1, pulse generation continuation time for continuing pulse generation is controlled by the control unit 18. In claims, the pulse signal is designated as a transmission signal, the pulse generator 1 is designated as a transmission signal generator.

The signal converter 2 converts (i.e., code-modulates) the phase of the pulse signal into the digital signal, which changes the phase of the pulse signal for each of the pulse sequences according to code sequences made as a combination of multiple codes. In claims, the signal converter 2 is designated as a modulation unit. The code sequence may be formed as a sequence of codes having a high auto-correlation. In the present embodiment, the code sequence of Barker code is used as an example. Further, as for the signal converter 2, the length of the code sequence used for modulation is changed by the control unit 18. Further, the change of the length of the code sequence may be realized as at least one of a change of the number of codes in one code sequence (i.e., one code length) and a change of the length of the code itself.

The sine wave generator 3 generates a sine wave having an arbitrary angular frequency $\omega 1$. Further, the sine wave generator 3 can also generate a sine wave that is in synchronization with an angular frequency of the pulse signal from the pulse generator 1. The sine wave signal from the sine wave generator 3 is output to the phase shifter 7 and to the multiplier 9.

The microphone 6 is, for example, a supersonic wave sensor, and has a piezoelectric element and a cover around the piezoelectric element. The microphone 6 is a resonance type microphone in which the cover resonates by the drive of the piezoelectric element. More specifically, when the pulse signal of phase change is provided from the signal converter 2 to the piezoelectric element, the piezoelectric element is driven to create resonance of the cover, from which the supersonic wave is transmitted.

As described above, the phase change (e.g., phase shift) of the pulse signal that drives the piezoelectric element enables the digital modulation of the phase of the transmission wave from the microphone 6. Further, as a plus-minus sign of the code sequence, "−1" is assigned for the pulse sequence of the pulse signal for phase-shifting of $\pi/2$ delay, and "+1" is assigned for the pulse sequence of the pulse signal for phase-shifting of $\pi/2$ advancement.

Further, the microphone 6 receives the reflected wave of the transmitted supersonic wave, and the reception of the wave causes an electric voltage in the piezoelectric element. The electric voltage is then amplified by the AMP 4, and is output to the ADC 5. The ADC 5 samples the received signal from the AMP 4 by using a sampling frequency of predetermined value (e.g., a two-, three-folds of the pulse signal frequency) for converting the receiving signal into the digital signal, and outputs the converted signal to the multipliers 8, 9. Therefore, in claims, the microphone 6 is designated as a wave transmission and reception unit.

Further, though there is only one microphone 6 shown in FIG. 1 for the object detection apparatus 100 of the present embodiment, there may be more than one microphone 6 in the apparatus 100. In such case, a switch may be used to switch the multiple microphones 6 at regular intervals, for the purpose of switching which one of the multiple microphones 6 is used to detect an object. By switching between the microphones 6, various directions of the vehicle can be covered for detecting an object. Further, in such case, parts other than the microphones 6 can be shared with other systems, thereby reducing the cost of the object detection apparatus 100.

The phase shifter 7, the multipliers 8, 9 and the LPF 10,11 are used to demodulate the received signal from the ADC 5 (i.e., quadrature de-modulation). More practically, a sine wave signal from the sine wave generator 3 is divided into two parts. One part is provided to the multiplier 8 after being phase shifted by the phase shifter 7, and the other part is provided to the multiplier 9 as it is (i.e., without phase-shift). The received signal from the ADC 5 is then provided to the multipliers 8, 9 for multiplication, and the after-multiplication signal is filtered by the LPFs 10, 11 to remove the high frequency components to have the de-modulated received signal.

The phase shifter 7 changes (i.e., shifts) the phase of the sine wave signal from the sine wave generator 3 to have a predetermined phase (e.g., $-\pi/2$). The multiplier 8 multiplies the sine wave signal from the ADC 5 and the sine wave signal from the phase shifter 7. The multiplier 9 multiplies the sine wave signal output from the ADC 5 and the sine wave signal from the sine wave generator 3. In such manner, the received signal is divided into a same phase component (i.e., an I component) and an orthogonal (i.e., quadrature) component (i.e., a Q component).

The LPFs 10, 11 are used to remove the high frequency from the I, Q components of the received signal from the multipliers 8, 9, respectively. The high-frequency removed Q component of the received signal is then output from the LPF 10 to the integrator 12, and the high-frequency removed I component of the received signal is then output from the LPF 11 to the integrator 13.

The integrators 12, 13 perform an integration operation for the I component and the Q component of the received signal from the LPFs 10, 11, respectively, one code by one code. In claims, the integrators 12, 13 are designated as an integration unit. The integrator 12 then outputs the integrated Q component of the received signal to the correlation filter 14, and the integrator 13 outputs the integrated I component of the received signal to the correlation filter 14.

In the present embodiment, though the integrators 12, 13 integrate the I, Q components from the LPFs 10, 11 by a unit of one code length, a different method, such as integration of samples of the I, Q components in a unit of one code length together with an averaging of such integration value, may be an option. In other words, an arithmetic mean of the samples in a unit of one code length may be calculated. The samples in unit of one code length means the samples in one bit in a case that the length of the code is seven bits.

The correlation filter 14 performs pulse compression to compress the pulse width of the received signal. Specifically, the code of the received signal is multiplied by a conjugated complex code of the modulation signal multiple times at timings that differ in time relative to the received signal, and an arithmetic mean of the above multiplication results is calculated. Then, the arithmetic mean of the received signals is compared with the modulation signal to find a correlation value (i.e., a conjugate correlation value signal), and the correlation value is output to the determination unit 15. In claims, the correlation filter 14 is designated as a pulse compression unit.

In the following, the calculation of the correlation value is described in more detail. First, the pulse generator 1 generates the pulse signal (f[t]) with angular frequency ($\omega$) as transmission signals, and transmits the transmission signals while digitally modulating the phases thereof. In this case, the fundamental component of the transmission waves is expressed by equation 1. The term $\theta[t]$ in equation 1 is a function that represents a modulation component of the transmission signal after phase modulation.

$$\text{Transmission wave} = f[t] \times \cos(\omega t + \theta[t]) \quad \text{(Equation 1)}$$

Then, if the received signals of reflected waves having a frequency component nearly equal to the transmission waves are de-modulated orthogonally (i.e., quadrature de-modulated) by using the sine wave signals of an angular frequency ($\omega 1 t + \theta 2$), and are separated into the in-phase components and the orthogonal components of the de-modulation signals, the de-modulation signals become as expressed by equation 2 in the following, where $\theta 2$ is a phase difference produced when the transmission wave propagates through a passage along which it is reflected by the object to be detected and is received.

(Equation 2)

$$\begin{aligned}\text{Demodulation signal} &= f[t] \times \cos(\omega t + \theta[t]) \times \cos(\omega 1 t + \theta 2) + \\ &\quad j\{f[t] \times \cos(\omega t + \theta[t]) \times -\sin(\omega 1 t + \theta 2)\} \\ &= (1/2) \times f[t] \times \{\cos(\omega t + \theta[t] + \omega 1 t + \theta 2) + \\ &\quad \cos(\omega t + \theta[t] - \omega 1 t - \theta 2)\} - \\ &\quad (1/2) \times j\{\sin(\omega t + \theta[t] + \omega 1 t + \theta 2) + \\ &\quad \sin(-\omega t - \theta[t] + \omega 1 t + \theta 2)\}\end{aligned}$$

When the orthogonal de-modulation is effected with the sine wave signal of the angular frequency ($\omega 1 = \omega$) in synchronization with the angular frequency ($\omega$) of the pulse signal (f[t]), the de-modulation signals are expressed by equation 3.

(Equation 3)

$$\begin{aligned}\text{Demodulation signal} &= (1/2) \times f[t] \times \{\cos(\omega t + \theta[t] + \omega t + \theta 2) + \\ &\quad \cos(\omega t + \theta[t] - \omega t - \theta 2)\} - \\ &\quad (1/2) \times j\{\sin(\omega t + \theta[t] + \omega t + \theta 2) + \\ &\quad \sin(-\omega t - \theta[t] + \omega t + \theta 2)\} \\ &= (1/2) \times f[t] \times \{\cos(2\omega t + \theta[t] + \theta 2) + \\ &\quad \cos(\theta[t] - \theta 2)\} - (1/2) \times \\ &\quad j\{\sin(2\omega t + \theta[t] + \theta 2) + \sin(-\theta[t] + \theta 2)\}\end{aligned}$$

If the component of a frequency twice as great as the angular frequency ($\omega$) is removed from the de-modulation signals expressed by the above equation 3 by using LPFs 10, 11, the output from the LPFs 10, 11 is expressed in equation 4, where A is a constant.

$$\text{LPF output} = (1/2) \times f[t] \times \cos(\theta[t] - \theta 2) + \qquad \text{(Equation 4)}$$
$$j(1/2) \times \sin(\theta[t] - \theta 2)$$
$$= A \times f[t] \times e^{j(\theta[t] - \theta 2)}$$

As described above, the orthogonal (i.e., quadrature) de-modulation is effected by using the sine wave signal of an angular frequency in synchronization with the angular frequency (ω) of the pulse signals (f[t]), and the component of a frequency twice as high contained in the de-modulation signals is removed therefrom to pick up the amplitude (A) component and the phase component (θ[t]−θ2) of the received signals. As a result, the received signals having an improved S/N ratio can be compressed through the correlation filter 14. Though this embodiment employs the orthogonal (i.e., quadrature) demodulation as a method of picking up the amplitude component and the phase component of the received signals, the amplitude/phase pick-up method is not necessarily limited to the orthogonal demodulation, and may be other methods.

Then, the correlation filter 14 calculates the correlation value that represents the correlation between the received signal that is output from the LPFs 10, 11 and the modulation signal. Specifically, by multiplying the sign of the received signal by the conjugated complex sign of the modulation signal at timings that differ in time relative to the received signal and by calculating an arithmetic mean of such multiplication result with the use of equation 5, where (N) in equation 5 is the code length of the code sequence (i.e., the number of codes).

$$(1/N) \times \Sigma \{A \times f[t] \times e^{j(\theta[t] - \theta 2)} \times e^{-j\theta[t]}\} =$$
$$(1/N) \times \Sigma \{A \times f[t] \times e^{-j\theta 2}\} \qquad \text{(Equation 5)}$$

If the calculated result of equation (5) is shown on a complex plane (i.e., IQ plane) comprising the in-phase component (I) and the orthogonal component (Q), a vector is obtained in a predetermined direction (i.e., a point on the IQ plane). By adding and averaging the multiplication results (i.e., by calculating an arithmetic mean of the results), a vector of a magnitude proportional to the number of times of addition is obtained. As for the noise contained in the received signals, there is no correlation between the noise signals that are received and the modulation signals even when there are received waves of a frequency nearly equal to the transmission waves. Therefore, the noise is randomized on the IQ plane, and the noise vectors are small.

The correlation filter 14 performs pulse compression to compress the pulse width of the received signal and to calculate the correlation between the received signal and the modulation signal, the correlation value representing the degree of correlation has a distinct peak that is distinct from the other portion (i.e., side-lobes). Therefore, the reflected wave from the detection object is received as the received signal that has an improved S/N ratio.

Figure 2A:
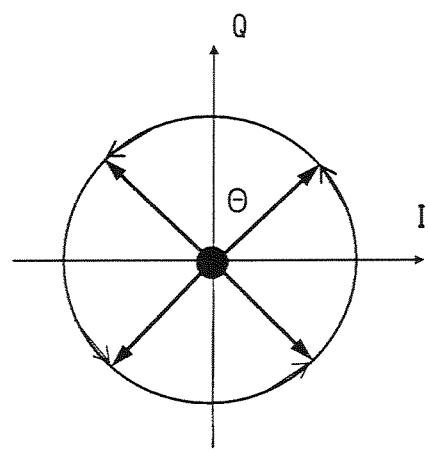
FIG. 2A is an illustration of a received signal vector rotating in an IQ plane when one code length includes a multi-rotation phase.
Figure 2B:
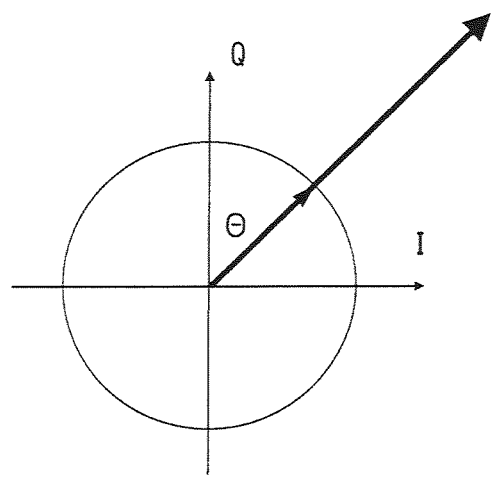
FIG. 2B is an illustration of a received signal vector in the IQ plane when the single code sequence has no phase rotation.

When the pulse compression is performed with the conventional method, a false detection of an object that is not in the range of the target relative speed (i.e., anon-targeted detection object) may occur, due to the high autocorrelation of the code of the relative speed of such object, which happens to have a multiple-rotation phase in one code sequence (i.e., a rotation of twice or more of 2π phase shift). In contrast, the pulse compression of the present disclosure has the integrators 12, 13 for calculating the integrated value, thereby yielding mutually-weakened outputs when the relative speed has a multiple-rotation phase in one code sequence (FIG. 2A). However, when the phase scarcely changes/rotates in one code sequence, the outputs will not be weakened with each other, thereby yielding a greater correlation value (FIG. 2B).

Therefore, an object in the target relative speed range can be easily distinguished from the other objects that are not targeted. That is, false detection of non-targeted objects is prevented. FIG. 2A is an illustration of a situation where the received signal vector has a multiple-rotation phase on the IQ plane in one code length. Further, FIG. 2B is an illustration of a situation where the received signal vector has no rotation of phase on the IQ plane in one code length.

The determination unit 15 determines that the detection object has been detected when the amplitude level of the amplitude of the correlation value calculated by the correlation filter 14 is equal to or greater than a predetermined value. Further, if the amplitude level is not equal to or greater than the predetermined value, it is determined that the detection object has not been detected. Then, the reception timing of receiving the reflected wave by the microphone 6 is determined based on the time of receiving the wave with its amplitude equal to or greater than the predetermined level.

Further, the object detection apparatus may be configured to determine that the detection object is detected when the amplitude level of the amplitude of the correlation value that is calculated by the correlation filter 14 is equal to or greater than the predetermined level and such correlation value has the phase shift amount equal to or less than a predetermined amount in one code sequence. This is because use of both of the amplitude of the correlation value and the phase shift amount enables a more accurate detection and distinction between the target object and the non-target object.

More practically, it may be stated that the phase shift amount of the correlation value takes a smaller value while its amplitude takes a greater value if the relative speed is within the target range and the phase rotation amount is a small value. On the other hand, the phase shift amount of the correlation value takes a greater value while its amplitude takes a smaller value if the relative speed is not within the target range and the phase rotation amount is a large value. A practical example of such situation is described with reference to FIGS. 3A and 3B, which are to be read together.

Figure 3A:
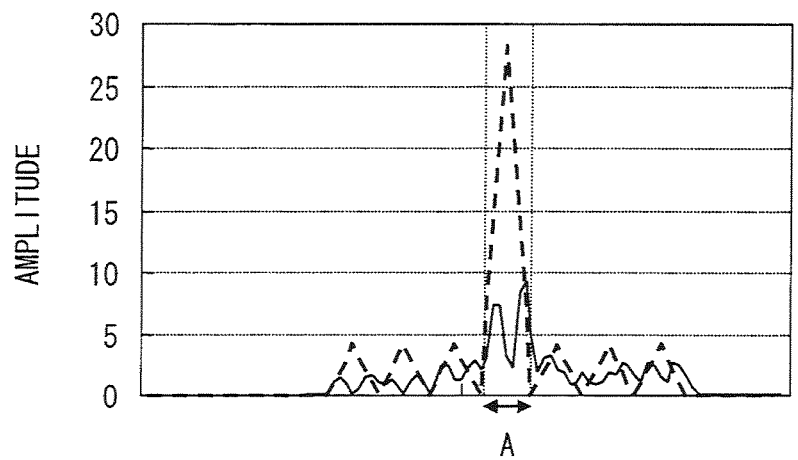
FIG. 3A is a diagram of amplitude change of a correlation value of reflected waves from a side-by-side traveling vehicle and a standstill object.
Figure 3B:
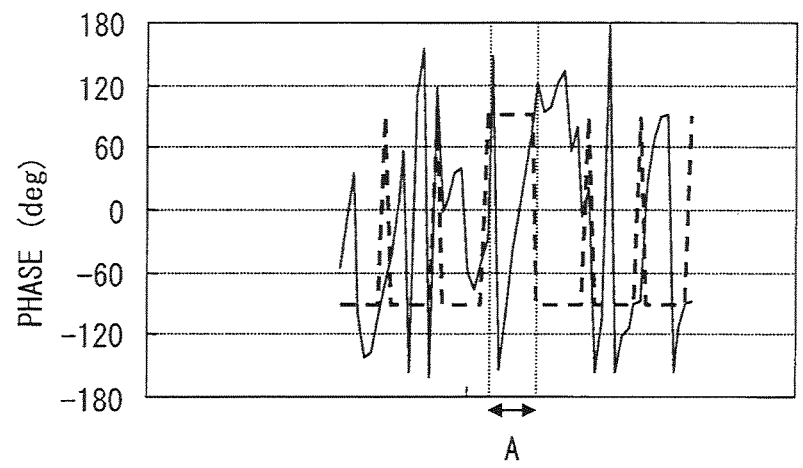
FIG. 3B is a diagram of phase shift of the correlation value of reflected waves from the side-by-side traveling vehicle and the standstill object.

In the example of FIGS. 3A, 3B, the subject vehicle is traveling and detection targets are vehicles traveling side-by-side with the subject vehicle. That is, the target relative speed range is around 0 km/h. In FIGS. 3A, 3B, the amplitude change and the phase shift are respectively illustrated for the correlation values of the received wave from the vehicle traveling side by side with the subject vehicle and from the standstill object. In FIGS. 3A, 3B, the broken lines represent the side-by-side vehicle and the solid lines represent the standstill object. Further, a range A in FIGS. 3A, 3B represents one code length.

As shown in FIGS. 3A, 3B, the correlation value about the reflected wave from the side-by-side vehicle in the target relative speed range has a small phase shift amount and a great amplitude. On the other hand, the correlation value about the standstill object not within the target relative speed range has a greater phase shift amount and a smaller amplitude. Therefore, by considering both of the amplitude and the phase shift amount of the correlation value, the detection object and the other objects are easily and accurately distinguished.

The distance detection unit 16 detects a distance to the reflecting object based on a time difference between a generation timing of the pulse signal (i.e., a transmission timing of the supersonic wave from the microphone 6) and a reception timing of the reflected wave determined by the determination unit 15. When the distance detected by the distance detection unit 16 is within a predetermined value, the notification unit 17 generates a warning or the like, for notifying the occupant of the subject vehicle about the approach of the subject vehicle to the object.

The control unit 18 controls, as described above, the pulse generation continuation time for continuous generation of the pulse signal from the pulse generator 1. The control unit 18 may control the pulse generation continuation time based on, for example, the vibration characteristic of the microphone 6 and the combination of the code, which is used to form the code sequence by the signal converter 2.

Further, the control unit 18 changes the length of the code sequence (i.e., a code sequence length), which is used by the signal converter 2 according to a speed of the subject vehicle which is obtained by the vehicle speed sensor 101 (i.e., vehicle speed hereinafter). Therefore, in claims, the control unit 18 is designated as a movement speed acquisition unit. The control unit 18 may, for example, acquire the vehicle speed of the subject vehicle from the vehicle speed sensor 101 through an in-vehicle LAN and/or an ECU.

Further, the control unit 18 may be configured to set a longer code sequence length when the vehicle speed is greater than or equal to a first preset speed, relative to a code sequence length of a second preset speed, which is set to have a smaller value than the first preset speed. More practically, the first preset speed may be set as a high travel speed performed in, for example, an expressway, such as at 80 km/hr (i.e., 50 miles/hr). The second preset speed may be set as a low travel speed performed in, for example, a parking facility, such as at 10 km/hr (i.e., 5 miles/hr). Further, when the vehicle speed is greater than or equal to the first preset speed, the code sequence length may be set to, for example, seven bits, and when the vehicle speed is less than or equal to the second preset speed, the code sequence length is set to, for example, two bits. Further, the control unit 18 controls the correlation filter 14 to reflect/respond to the set value of the code sequence length (i.e., length of the code sequence).

Figure 4:
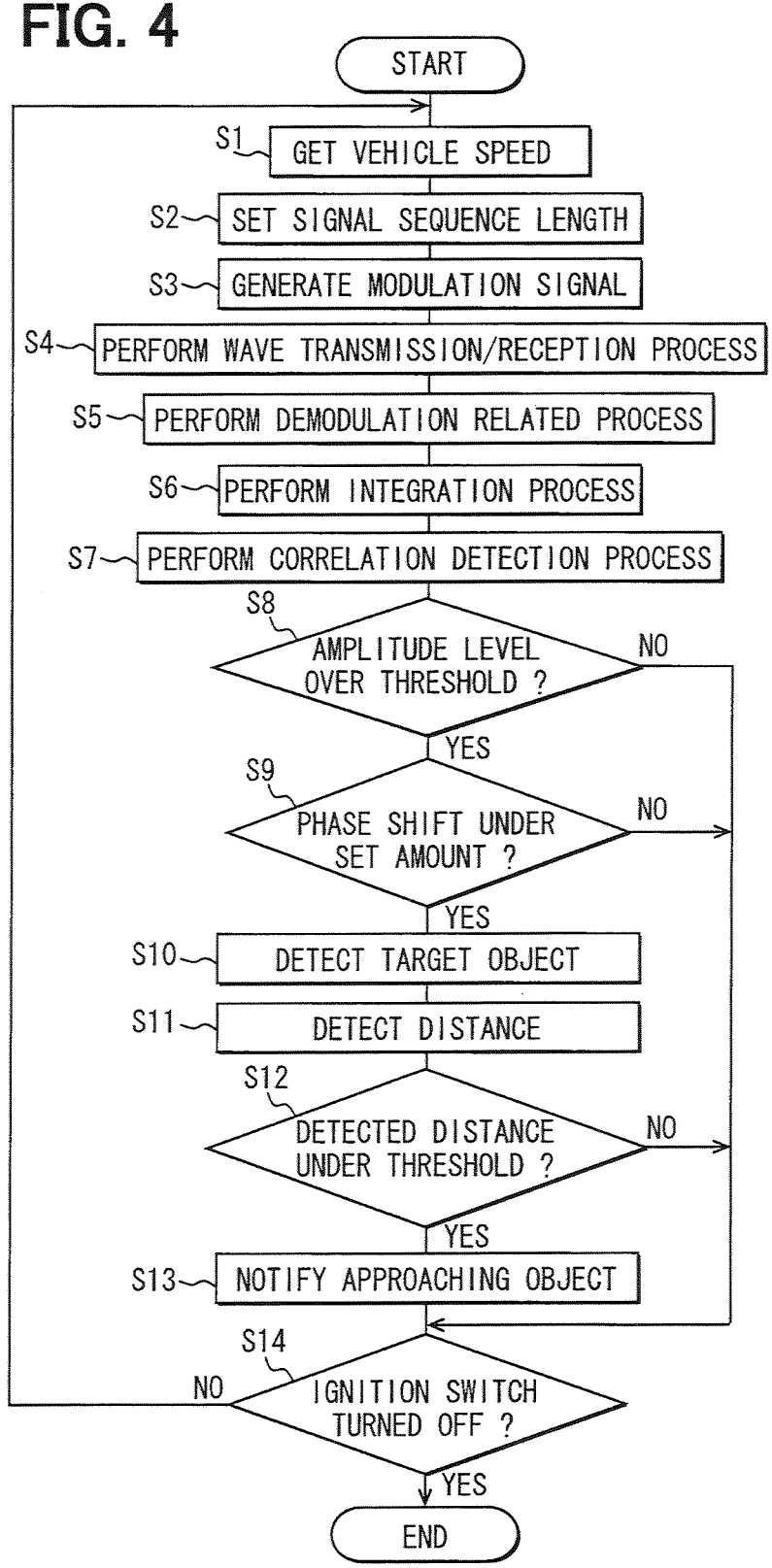
FIG. 4 is a flowchart of an operation of the object detection apparatus.

A flowchart of the operation of the object detection apparatus 100 is illustrated in FIG. 4. When, for example, an ignition switch of the subject vehicle is turned on, the operation of the object detection apparatus 100 starts. Further, the operation of the apparatus 100 may be started when the accessory power supply of the subject vehicle is turned on, and the operation of the apparatus 100 may be finished when the accessory power supply is turned off.

In S1, the control unit 18 acquires the vehicle speed of the subject vehicle from the vehicle speed sensor 101, and in S2, the control unit 18 sets the code sequence length to be used by the signal converter 2 according to the vehicle speed. In S3, the signal converter 2 generates the modulation signal by performing the code modulation of the phase of the pulse signal that is generated by the pulse generator 1 according to the code sequence length set in S2.

In S4, a wave transmission and reception process is performed. In the wave transmission and reception process, a supersonic wave is transmitted from the microphone 6 based on the modulation signal, which is generated by the signal converter 2, and is supplied for the microphone 6 after having a boost of the electric voltage for driving the microphone 6. Further, the microphone 6 is used to receive the reflected supersonic wave that is caused as a reflection of the transmission wave. As described above, the voltage generated in the piezoelectric element of the microphone 6 by the receipt of the supersonic wave is amplified to a predetermined level by the AMP 4, and is provided to the ADC 5. Then, the ADC 5 samples the received signal from the AMP 4 by using a sampling frequency of predetermined value, and converts the sampled signal into a digital signal, and outputs the converted received signal to the multipliers 8, 9.

In S5, a de-modulation related process is performed. By the de-modulation related process, the sine wave signal from the sine wave generator 3 is divided into two parts, and one is provided to the multiplier 8 after receiving a phase shift by the phase shifter 7, and the other is provided to the multiplier 9, as it is without phase shift. Then, the received signal from the ADC 5 is supplied to the multipliers 8, 9 for multiplication, and the after-multiplication signal is filtered by the LPFs 10, 11 to remove the high frequency components to have the de-modulated received signal.

In S6, an integration process is performed. By the integration process, the integrators 12, 13 integrate, the I component and the Q component of the received signal output by the LPFs 10, 11 for the components in one code length, and the integrated I, Q components of the received signal are provided to the correlation filter 14.

In S7 a correlation detection process is performed. By the correlation detection process, correlation of the received signal with the modulation signal is examined by the correlation filter 14. Subsequently, in S8, the determination unit 15 determines whether an amplitude level of the amplitude of the correlation value examined by the correlation filter 14 is greater than or equal to a predetermined amplitude level (i.e., a threshold). If the amplitude level is greater than or equal to the threshold (S8. YES), the process proceeds to S9. If the amplitude level is not greater than nor equal to the threshold (S8. NO), the process proceeds to S14.

In S9, the determination unit 15 determines whether the phase shift amount of the correlation value in one code length is less than or equal to the predetermined amount (i.e., a threshold). If the phase shift amount is less than or equal to the predetermined amount (S9. YES), the process proceeds to S10. If the phase shift amount is not less than nor equal to the predetermined amount (S9, NO), the process proceeds to step S14.

In S10, the determination unit 15 determines that the detection object has been detected, and the reception timing is determined based on the time of the amplitude of the correlation value having a greater-than-threshold level. In S11, the distance detection unit 16 detects the distance to the reflecting object based on the time difference between a transmission timing of the supersonic wave from the microphone 6 and a reception timing of receiving the reflected wave determined by the determination unit 15.

In S12, if the distance detected by the distance detection unit 16 is less than or equal to the predetermined value (S12, YES), the process proceeds to step S13. If the distance detected by the distance detection unit 16 is not less than nor equal to the predetermined value (S12, NO), the process proceeds to S14. In S13, the notification unit 17 generates a warning or the like, for notifying the occupant of the subject vehicle about the approach of the subject vehicle to the object. The process then proceeds to S14.

In S14, if the ignition switch of the subject vehicle is turned off (S14. YES), the process is concluded. If the ignition switch of the subject vehicle is not turned off (S14, NO), the process returns to S1 to repeat the operation.

According to the above-described process and configuration, the received signal undergoes the pulse compression, and as a result, the S/N ratio of the received signal is improved and a detection distance of the external object is extended.

Further, the code sequence used for the pulse compression has a greater phase rotation amount for the same relative speed as the code sequence length becomes longer, thereby decreasing the high output width for the autocorrelation. This means that the relative speed range of the detection object is decreased. If the code sequence length is decreased, the phase rotation amount for the same relative speed becomes shorter, thereby increasing the high output width in the autocorrelation calculation. This means that the relative speed range of the detection object is increased.

According to the above configuration, the length of the code sequence (i.e., the code sequence length) is changed in proportion to the vehicle speed, the relative speed range of the detection object is changed according to the vehicle speed of the subject vehicle. As a result, change/adjustment of the relative speed range of the detection object according to the speed of the moving object is enabled while improving the S/N ratio of the received signal.

In an example of the present embodiment, the code sequence length is set to have a large value (e.g., seven bits) for high speed travel and is set to have a small value (e.g., two bits) for low speed travel, and the correlation filter 14 is configured not to perform the correction of the Doppler shift for the received signal. Therefore, during high speed travel, only an object of little or no relative speed relative to the subject vehicle is considered as the detection object, and, during low speed travel, an object having a relative speed with the subject vehicle is considered as the detection object. Therefore, during high speed travel in an expressway or the like, only the vehicle traveling side by side with the subject vehicle, having no/little relative speed, is considered as the detection object, and, during low speed travel in a parking facility or the like, not only the object having a relative speed such as a stopping vehicle and/or a vehicle stopper but also the walker or the like which has no/little relative speed can be detected. As a result, the detection of the external object is performed suitably according to a situation, and the usability of the apparatus as well as user convenience are improved.

Further, in the above embodiment, the code sequence length is changed for one case having the first preset speed and the other case having the second preset speed that is less than the first preset speed. However, the code sequence length may be changed in a different manner. That is, the code sequence length may be changed with reference to a threshold speed, or the code sequence length may be changed according to speed ranges in three or more steps.

Furthermore, when it is determined that the subject vehicle is stopping, code sequence length may be changed periodically. In the following, such configuration (i.e., a first modification example) is described, where like parts have like numbers.

In the first modification example, the control unit 18 acquires the vehicle speed of the subject vehicle from the vehicle speed sensor 101, and, based on the acquired vehicle speed, the control unit 18 determines whether the subject vehicle is stopping. In claims, therefore, the control unit 18 is designated as a vehicle stopping determination unit. More practically, the control unit 18 determines that the subject vehicle is stopping when the acquired vehicle speed is less than or equal to a predetermined value. The predetermined value in this case means a detection limit of the vehicle speed sensor 101, and such value may be substantially equal to 0 km/h.

Further, the control unit 18 periodically switches the code sequence length used in the signal converter 2 between a first length and a second length that is shorter than the first length when it determines that the subject vehicle is stopping. The first length may be a code sequence length of, for example, seven bits in the present embodiment as, and the second length may be a code sequence length of, for example, two bits.

When transmission signal is digitally-modulated for transmission and a distance to the detection object is short, the longer a code sequence length is, it is more likely to have a longer overlapping time between the transmission wave and the reflected wave, thereby making it difficult to detect an object. On the other hand, if the code sequence length is short, it is less likely to have such an overlapping time between the transmission wave and he reflected wave, thereby making it easier to detect the detection object even when a distance to the object is short. In other words, when the stopping vehicle starts to travel, it may be more important to detect the detection object existing very closely to the subject vehicle or hiding behind something very close to the subject vehicle, thereby increasing the necessity of detecting a closer detection object, which is closer to the subject vehicle than the time of traveling.

Therefore, in the configuration of the first modification example, the length of the code sequence is changed/switched periodically when it is determined that the subject vehicle is stopping. It enables the improvement of the S/N ratio of the received signal by using a longer code sequence length, and also enables the detection of closer detection objects by using a shorter code sequence length. Therefore, in case that the closer detection objects need to be detected, detection of the closer detection object is enabled while improving the S/N ratio of the received signal.

Further, when it is determined by the control unit 18 that the subject vehicle is stopping and the detection object is detected with the code sequence length having been switched to the second length (e.g., two bits), the code sequence length may be kept unchanged from the second length while the detection object is being detected. In such manner, once the object is detected while the subject vehicle is stopping, the detection of the closer detection object is easily being kept detected by the use of the shorter code sequence length.

Further, in first modification example, the code sequence length may be switched to the length greater than or equal to the first length of, for example, eleven bits or the like for use in the signal converter 2 under control of the control unit 18, when it is determined by the control unit 18 that the subject vehicle is not stopping. In such manner, when it is not necessary to detect the closer detection object after the start of the travel of the vehicle, the code sequence length is switched to the longer length that is longer than the length used in the vehicle stopping time, thereby more securely improving the S/N ratio of the received signal.

In addition, when it is determined by the control unit 18 that the subject vehicle is stopping and the detection object is detected with the code sequence having been switched to the second length (e.g., two bits), the code sequence length may be set to the second length at a time of detecting thereafter that the vehicle is not stopping. Alternatively, when it is determined by the control unit 18 that the subject vehicle is stopping and the detection object has not been detected with the code sequence having been switched to the second length, the code sequence length may be set to be equal to or greater than the first length of eleven bits.

In such manner, if an object has already been detected with the shorter code sequence while the subject vehicle is stopping, the shorter code sequence may be kept being used to enable an easier detection of the closer detection object after the start of the travel of the subject vehicle. On the other hand, if a detection object has not already been detected with the shorter code sequence while the subject vehicle is stopping, the longer code sequence length (i.e., longer than the length used at the time of stopping) may be used to securely improve the S/N ratio of the received signal, since it seems to be less likely to suddenly have a detection object at a short distance from the traveling subject vehicle after the start of the travel, not necessitating the detection of the closer detection object.

Further, in the first embodiment, the correction of the Doppler shift for the received signal is not performed by the correlation filter 14. However, such configuration may be changed. For example, the correlation filter 14 may use a phase rotation correction coefficient for correcting the Doppler shift, for the purpose of enabling the detection of an object that has a greater relative speed to the subject vehicle. The phase rotation correction coefficient is a coefficient for rotating the phase of the received signal. The phase rotation correction coefficient may be set to have a value that cancels the phase rotation by the Doppler shift, correction of the phase rotation of the received signal is enabled. Further, by switching the phase rotation correction coefficient according to the vehicle speed of the subject vehicle, the relative speed range of the detection object is set according to the vehicle speed of the subject vehicle. Such configuration is described in the following as a second modification example.

In the following, the second modification example 2 is described, where like parts have like numbers.

In the second modification example, the correlation filter 14 corrects the Doppler shift of the received signal with the phase rotation correction coefficient, and performs pulse compression for the received signal after such correction. In such correction, the phase rotation correction coefficient is variably changed.

The control unit 18 changes/switches a phase rotation correction coefficient used in the correlation filter 14 between two vehicle speeds. For instance, between a vehicle speed greater than or equal to the first predetermined speed and a vehicle speed less than or equal to the second predetermined speed. For example, in the second modification example, the first predetermined speed may be a speed of 80 km/h for a high speed travel in an expressway, and the second predetermined speed may be a speed of 10 km/h for a low speed travel in the parking lot or the like. Further, the length of the code sequence used in the signal converter 2 may be set to seven bits for a vehicle speed greater than or equal to the first predetermined speed, and may be set to two bits for a vehicle speed less than or equal to the second predetermined speed.

When the vehicle speed is greater than the first predetermined speed, the control unit 18 does not allow the correlation filter 14 to perform correction on the received signal by using the phase rotation correction coefficient. Further, when the vehicle speed is greater than the first predetermined speed, the phase rotation correction coefficient may be set to 1 for substantially preventing the correction of the received signal. When the code sequence length is seven bits, the phase rotation correction coefficient given to each one of seven bits may be all set to 1.

Further, when the vehicle speed is lower than the second predetermined speed, the control unit 18 may control the correlation filter 14 to switch the phase rotation correction coefficient to have a predetermined value. In this case, the predetermined value of the phase rotation correction coefficient is a value that corrects the Doppler shift of the received signal provided from the reflected wave reflected by the detection object that has the target relative speed. Such predetermined value may be calculated according to the target relative speed for detecting an object in advance. For example, when an object having a relative speed of −5 km/h is considered as the detection object, the phase rotation correction coefficient may be pre-calculated based on (a) the phase shift amount (AO) by the Doppler shift of the received signal which is derived from the reflected wave reflected by the object having the relative speed of −5 km/h and (b) the modulation speed. Further, such pre-calculated value may be stored in a memory of the control unit 18.

According to the above configuration, since correction of the Doppler shift of the received signal is not performed by the correlation filter 14 at the time of high speed travel, only the object having no/little relative speed is considered as the detection object. On the other hand, such correction of the Doppler shift for the target relative speed of the detection object will not be performed by the correlation filter 14, thereby allowing an object that has a greater relative speed to the subject vehicle to be considered as the detection object. Therefore, the detection of the external object is more easily performed according to a situation, and the usability of the apparatus as well as user convenience by using the apparatus are improved to a further extent.

(Second Embodiment)

In the first embodiment, an example of using only one pulse compression filter is shown. However, two or more pulse compression filters may be used, which may have respectively different phase rotation correction coefficients for the correction of the Doppler shift of the received signal.

Figure 5:
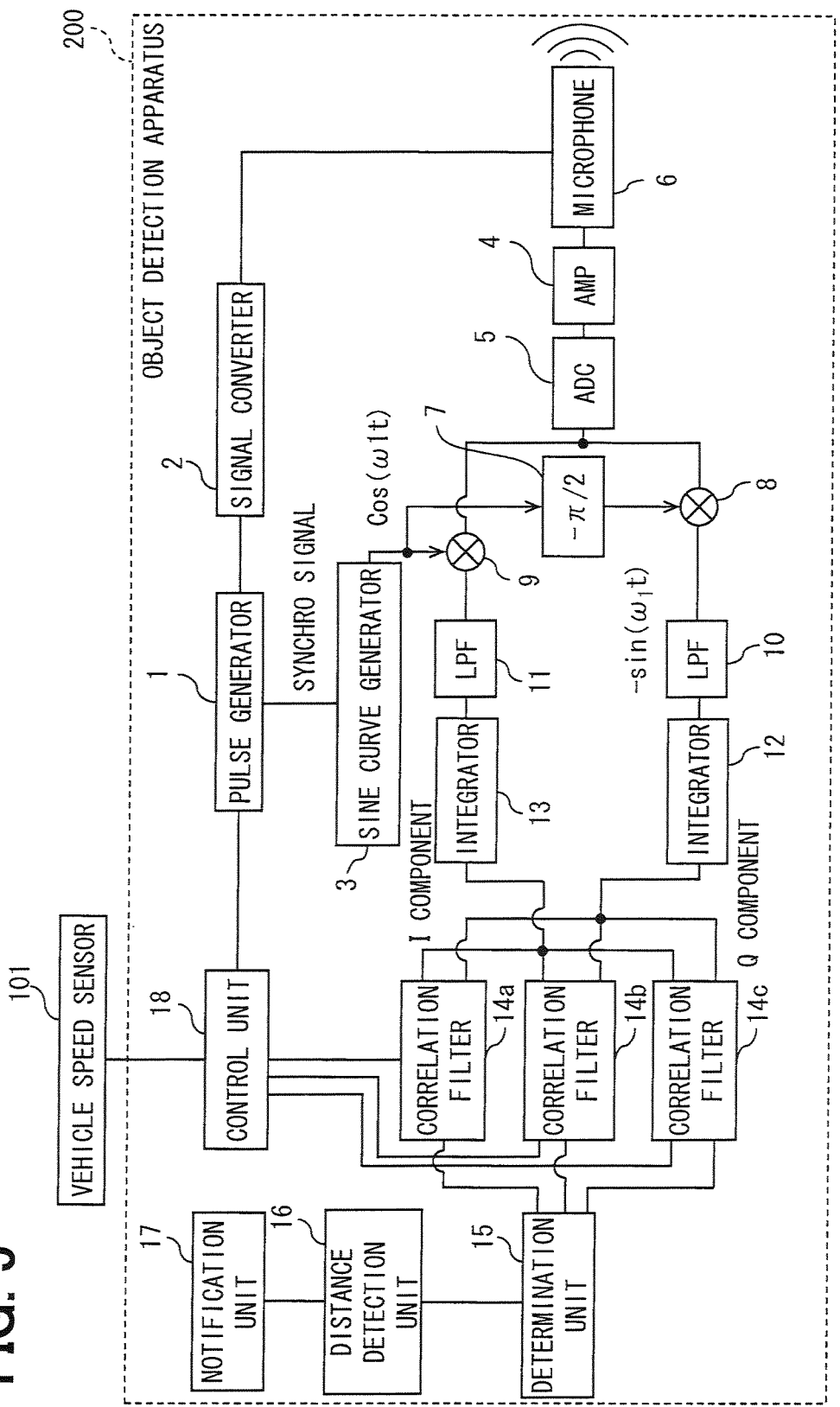
FIG. 5 is a block diagram of an object detection apparatus in a second embodiment of the present disclosure.

FIG. 5 is a block diagram of configuration of an object detection apparatus 200 in the second embodiment. The object detection apparatus 200 may be installed in a vehicle. A vehicle having the object detection apparatus 200 is designated as a subject vehicle in the following.

The object detection apparatus 200 includes the pulse generator 1, the signal converter 2, the sine wave generator 3, the AMP 4, the ADC 5, the microphone 6, the phase shifter 7, the multipliers 8, 9, the LPFs 10, 11 and the integrators 12, 13 as shown in FIG. 5. Further, the object detection apparatus 200 includes the microcomputer (not illustrated) to serve as a calculator/processor of various kinds, such as correlation filters 14a, 14b, 14c, the determination unit 15, the distance detection unit 16, the notification unit 17, and the control unit 18. Further, for brevity, like parts have like numbers as in the first embodiment, and previously-stated details of like parts have been omitted.

The integrators 12, 13 perform an addition (i.e., an integration operation) for the I component and the Q component of the received signal that is output from the LPFs 10, 11, one code sequence by one code sequence. Then, the integrator 12 outputs the integrated Q component of the received signal integrated to the correlation filters 14a, 14b, 14c, and the integrator 13 outputs the integrated I component of the received signal to the correlation filters 14a, 14b, 14c.

The correlation filters 14a, 14b, 14c are similar to the above-mentioned correlation filter 14 except that the filters 14a, 14b, 14c uses the phase rotation correction coefficient for phase rotation of the received signal. The correlation filters 14a, 14b, 14c perform the phase rotation of the received signal by using the phase rotation correction coefficient before multiplying the sign of the received signal by the conjugated complex sign of the modulation signal multiple times at timings that differ in time relative to the received signal.

When at least one of the correlation filters 14a, 14b, 14c has, as the phase rotation correction coefficient, a value for performing the phase rotation which cancels the phase rotation by the Doppler shift, such phase rotation correction coefficient is used for enabling correction of the phase rotation by the Doppler shift of the received signal. Further, when such phase rotation correction coefficient is actually used to correct the Doppler shift of the received signal, the vector of the received signal is not rotated in the IQ plane due to the non-addition of the phase shift caused by the Doppler shift, thereby yielding a high correlation value output from the correlation filter 14. Further, in claims, a phase rotation correction coefficient is designated as a correction coefficient about the Doppler shift of the received signal.

When a use of the object detection apparatus 200 is specifically determined, the relative speed range of the detection object may be pre-estimated, the phase rotation correction coefficient of each of the correlation filters 14a, 14b, 14c may be set to have a different value, for the purpose of covering the frequency bands of the Doppler shift according to the pre-estimated relative speed range. Further, though an example of using three correlation filters 14a, 14b, 14c respectively having a different phase rotation correction coefficient is shown in the second embodiment, the number of correlation fitters 14 may have values other than 3, according to the relative speed range of the detection object.

For example, a phase rotation correction coefficient K may, for example, be a value that is calculated by the following equation 6. Such value may be set to each of the correlation filters 14a, 14b, 14c. Further, "m" in the equation 6 is a number of the correlation filters 14, and "m" is an integer value assigned to each of the correlation filters 14, starting from 1. That is, for the correlation filters 14a, 14b, 14c, the number of m is 1, 2, 3, respectively. Further, "n" is a number of each of the code sequences, and "n" is an integer value assigned to the code at the end of the code sequence toward the first code in the code sequence, starting from 1. If the length of the code sequence is seven bits, a value of "n" for the code sequence is 7, 6, 5, 4, 3, 2, 1 for each of the codes in the code sequence, from the first code to the end code. Further, "L" is a code sequence length, and, if the code sequence length is seven bits, "L" takes a value of 7.

$$K(m, n) = \cos\left(\frac{(m-1)(n-1)}{L-1}\pi\right) + j\sin\left(\frac{(m-1)(n-1)}{L-1}\pi\right) \quad \text{(Equation 6)}$$

Figure 7A:
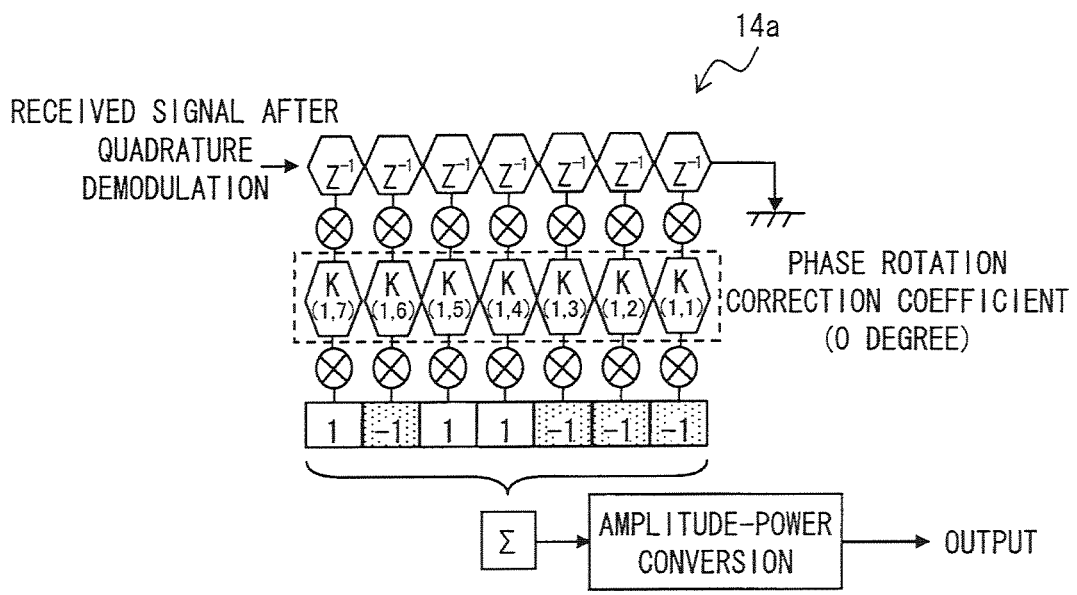
FIGS. 7A and 7B are configurations of the correlation filters having respectively different phase rotation correction coefficients.
Figure 7B:
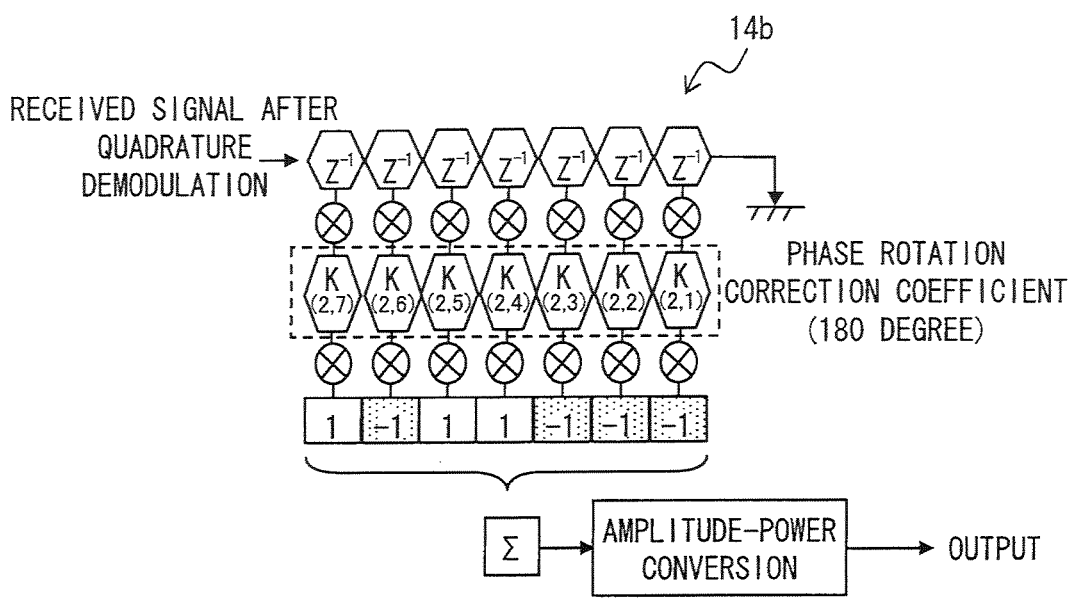

The phase rotation correction coefficient K is more practically described with reference to FIG. 6, FIGS. 7A/B. FIG. 6 is a table of the phase rotation correction coefficients about each of the codes in each of the correlation filters 14a, 14b. FIG. 7A and FIG. 7B show two configurations of the correlation filters 14 having respectively different phase rotation correction coefficients. In those examples of FIG. 6, FIGS. 7A, 7B, the correlation filters 14 are described as the correlation filter 14a and the correlation filter 14b, and the correlation filter 14a has a number 1, and the correlation filter 14b has a number 2. Further, the code length of the code sequence is determined as seven bits.

When the number of correlation filters 14 is two and the number of code length is seven, the phase rotation correction coefficient of each code in the correlation fitters 14a, 14b is shown in FIG. 6 according to the equation 6. More specifically, the phase rotation correction coefficients K (1,7)-K (1,1) from the first code to the end code are all set to 1. Therefore, even when each code of the received signal is respectively multiplied by the phase rotation correction coefficients K (1,7)-K (1,1) in the correlation filter 14a, such multiplication does not result in the phase rotation (see FIG. 7A).

On the other hand, the phase rotation correction coefficients K (2,7)-K (2,1) from the first code to the end code of the correlation filter 14b are, respectively, cos(6/6×π)+jsin(6/6×π), cos(5/6×π)+jsin(5/6×π), cos(4/6×π)+jsin(4/6×π)/, cos(3/6×π)+jsin(3/6×π), cos(2/6×π)+jsin(2/6×π), cos(1/6×π)+jsin(1/6×π), 1. Therefore, in the correlation filter 14b, the multiplication of each code by the respective phase rotation correction coefficients K (2,7)-K (2,1) yields the phase rotation of +180 degrees (see FIG. 7B).

In other words, in the correlation filter 14a, the pulse compression is suitably performed only for the received signal derived from the reflected wave reflected by the object having no/little speed difference (i.e., having the relative speed of substantially zero) to the subject vehicle, yielding an output of a high correlation value. On the other hand, in the correlation filter 14b, the pulse compression is suitably performed only for the received signal derived from the reflected wave reflected by the object that has the relative speed for causing the Doppler shift of around −180 degrees, yielding an output of a high correlation value. Therefore, by using respectively different phase rotation correction coefficients in each of the correlation filters 14a, 14b, the received signals are phase-rotated, for enabling the coverage of different relative speed ranges. In this case, when the phase rotation correction coefficient calculated by using equation 6 is set to each of the correlation filters 14, each of those filters 14 may cover a relative speed range of several km/h.

Then, the determination unit 15 may determine that the detection object has been detected when the largest amplitude level among the amplitude levels of the correlation values from the correlation filters 14a, 14b, 14c is greater than or equal to a predetermined amplitude level. As described above, since the amplitude level of the correlation value of the received signal from the reflected wave reflected by the object in the corresponding relative speed range is configured to have a high level, the existence of the detection object is accurately determined by performing a threshold determination for the largest value of the amplitude levels of the correlation values calculated by each of the correlation filters 14a, 14b, 14c.

Further, when it is determined that the detection object has been detected, by identifying the correlation filter 14 calculating the correlation value that has the largest amplitude level, the relative speed of the detection object may be determined by the determination unit 15. More practically, as described above, when one of the correlation filters 14 covering respectively different relative speed ranges is identified, the relative speed range covered by the identified correlation filter 14 is identified, thereby making it possible to estimate the relative speed of the detection object. Further, in the estimated relative speed range, a median of the range may be used as the estimation of the relative speed, for example.

The estimated and determined relative speed may be utilized in, for example, a contact dangerousness determination for avoiding a collision of the subject vehicle. Further, based on the vehicle speed of the subject vehicle from the vehicle speed sensor 101 and the estimated relative speed, it may be possible to determine an absolute speed of the detection object.

Further, by determining by the determination unit 15 whether each of the amplitude levels of the correlation values from the correlation filters 14a, 14b, 14c is equal to or greater than the predetermined threshold and finding that at least one amplitude level is above the threshold value, the detection of the detection object may be determined. As described above, since the amplitude level of the correlation value of the received signal from the reflected wave reflected by the object in the corresponding relative speed range is configured to have a high level, the existence of the detection object is accurately determined in such manner. Further, the threshold of the amplitude level used for such threshold determination may be respectively different for the correlation values from the correlation filters 14a, 14b, 14c.

Further, similarly to one of the above schemes, when it is determined that the detection object has been detected, the correlation filter 14 calculating the correlation value with an over-the-threshold amplitude level may be identified for determining the relative speed of the detection object in the determination unit 15.

Furthermore, the amplitudes of correlation values from the correlation filters 14a, 14b, 14c may be added for the comparison with a certain threshold, and, if the sum of the correlation values is equal to or greater than the threshold, the detection of the detection object may be determined. In such manner, the detection of the object can be performed without performing the threshold determination for each of the correlation values, thereby decreasing the process load.

The periodical switching of the code sequence lengths in case of determining that the subject vehicle is stopping in the first modification example may also be used in the second embodiment. Also, when it is determined that the subject vehicle is stopping and the detection object is detected with the code sequence having been switched to the second length, the code sequence length may be kept unchanged as the second length while the detection object is being kept detected.

Further, the code sequence length may be switched to the length equal to or greater than the first length of eleven bits or the like for use in the signal converter 2 under control of the control unit 18, when it is determined by the control unit 18 that the subject vehicle is not stopping. In addition, when it is determined by the control unit 18 that the subject vehicle is stopping and the detection object is detected with the code sequence having been switched to the second length, the code sequence length may be set to the second length at a time of detecting thereafter that the vehicle is not stopping. Alternatively, when it is determined by the control unit 18 that the subject vehicle is stopping and the detection object has not been detected with the code sequence having been switched to the second length, the code sequence length may be set to be equal to or greater than the first length.

Although the present invention has been fully described in connection with the preferred embodiment thereof with reference to the accompanying drawings, it is to be noted that various changes and modifications will become apparent to those skilled in the art.

In the above-mentioned embodiment, use of a supersonic wave as the transmission wave is described. However, the transmission wave may be any detection wave that can be used in the object detection apparatus of well-known type, and not limited to the supersonic wave. For example, a millimeter wave or the like may be used as the transmission wave.

Though the Barker code is used in the above description as an example of the code sequence, other code sequences may also be used, not limiting the code sequence type. In case that the code sequence length is set to more than 13 bits which is the maximum length of the Barker code, M sequence, Gold code or the like may be used. Further, the code sequence length may be as short as 1 bit, which may serve as the second length.

Further, when the millimeter wave or the like having a higher propagation speed is used as the transmission wave, which leads to no or little phase rotation, the integrators 12, 13 to prevent the false detection of the object due to the phase rotation may be omitted from the configuration. On the other hand, when a slow detection wave such as a supersonic wave or the like, use of the integrators 12, 13 is preferable, because a slow propagation speed of the detection wave leads to the phase rotation.

Further, though the acquisition of the vehicle speed of the subject vehicle from the vehicle speed sensor 101 is described above, the vehicle speed may be acquired in a different manner. For example, the control unit 18 may estimate the vehicle speed of the subject vehicle based on a shift position. The shift position may be acquired from the a not-illustrated position sensor by the control unit 18. Further, when the shift position is in a P position, which indicates parking, or in an N position, which indicates a neutral, or just after switching from a D (i.e., driving) position to an R (i.e., reverse) position, the vehicle speed may be estimated as 0 km/h. Further, when the shift position is in the D position or the like, the vehicle speed may be roughly estimated based on a shift value.

In the above-mentioned embodiment, the object detection apparatus 100 and the object detection apparatus 200 are installed in the vehicle. However, those apparatus 100/200 may be installed in other objects. For example, it may be installed in a moving body other than the automobile, or it may be installed in a bicycle, in a moving robot, or the like.

Such changes and modifications are to be understood as being within the scope of the present invention as defined by the appended claims.

What is claimed is:

1. An object detection apparatus disposed in a moving body, the apparatus comprising:
a transmission signal generator generating a transmission signal of multiple pulse sequences as a plurality of sequences of multiple pulses;
a modulation unit generating a modulation signal of the transmission signal by performing digital modulation on each of the multiple pulse sequences of the transmission signal according to a code sequence;
a wave transmission and reception unit generating and transmitting a transmission wave based on the modulation signal from the modulation unit, and receiving a reflected wave of the transmission wave;
a pulse compression unit calculating a code correlation value between the modulation signal and a received signal, and performing pulse compression on the received signal based on a calculation result of the code correlation value to generate a pulse-compressed received signal, the received signal being derived from the reflected wave received by the wave transmission and reception unit;
a movement speed acquisition unit acquiring a speed of the moving body, and
a stopping determination unit determining whether the moving body is stopping, wherein
a length of the code sequence is modified according to the speed acquired by the movement speed acquisition unit,
an object is detected based on the pulse-compressed received signal from the pulse compression unit; and
when the stopping determination unit determines the moving body is stopping, the length of the code sequence is periodically switched between a first length and a second length, the second length being shorter than the first length.

2. The object detection apparatus of claim 1, wherein
the length of the code sequence is changed when the speed acquired by the movement speed acquisition unit is greater than or equal to a first speed or the speed is less than or equal to a second speed, the second speed being less than the first speed.

3. The object detection apparatus of claim 2, wherein
when the speed acquired by the movement speed acquisition unit is greater than the first speed, the length of the code sequence is set to be longer than when the speed is less than or equal to the second speed.

4. The object detection apparatus of claim 1, wherein, when the vehicle stopping determination unit determines that the moving body is stopping, and when an object is detected with the length of the code sequence having been switched to the second length, the length of the code sequence is kept unchanged from the second length while the object is being detected.

5. The object detection apparatus of claim 1, wherein, when the vehicle stopping determination unit determines that the moving body is not stopping, the length of the code sequence is switched to being greater than or equal to the first length.

6. The object detection apparatus of claim 1, wherein, when the vehicle stopping determination unit determines that the moving body is stopping and an object is detected with the length of the code sequence having been switched to the second length, a subsequent determination by the vehicle stopping determination unit that the moving body is not stopping leads to switching the length of the code sequence to the second length, and when the vehicle stopping determination unit determines that the moving body is stopping and the object has not been detected with the length of the code sequence having been switched to the second length, the length of the code sequence is switched to being greater than or equal to the first length.

7. The object detection apparatus of claim 1 further comprising:

an integration unit integrating the received signal, integration of the received signal being performed for each code in the code sequence, wherein the pulse compression unit calculates the code correlation value between the received signal of the one code sequence integrated by the integration unit and the modulation signal, and performs pulse compression on the received signal based on a calculation result of the code correlation value.

8. The object detection apparatus of claim 7, wherein an object is detected based at least on the amplitude, from among the amplitude and the phase shift amount of the code correlation value calculated by the pulse compression unit.

9. The object detection apparatus of claim 1, wherein a plurality of the pulse compression units are provided, respectively having different correction coefficient used for correcting a Doppler shift, the plurality of the pulse compression units respectively calculate the code correlation values between the modulation signal and the received signal after the Doppler shift correction by using the correction coefficient, from among the amplitude levels of the correlation values calculated by the plurality of the pulse compression units, a largest amplitude level is compared with a threshold amplitude level, and the comparison result of the amplitude level is used for determining whether an object is present.

10. The object detection apparatus of claim 9, wherein when an object has been detected, a relative speed of the object is determined by identifying the pulse compression unit calculating the correlation value that has the largest amplitude level.

11. The object detection apparatus of claim 1, wherein a plurality of the pulse compression units are provided, respectively having different correction coefficient used for correcting a Doppler shift, the plurality of the pulse compression units respectively calculate the code correlation values between the modulation signal and the received signal after Doppler shift correction by using different correction coefficient, the amplitude levels of the correlation values calculated by the plurality of the pulse compression units are respectively compared with a threshold amplitude level, and the comparison results of the amplitude levels are used for determining whether an object is present.

12. The object detection apparatus of claim 11, wherein when an object has been detected, a relative speed of the object is determined by identifying at least one of the plurality of the pulse compression units calculating the correlation value that has the amplitude level of greater than or equal to a predetermined level.

\* \* \* \* \*